US012810159B2

(12) United States Patent
Trusov et al.

(10) Patent No.: US 12,810,159 B2
(45) Date of Patent: Nov. 24, 2026

(54) 4.6-BIT QUANTIZATION FOR FAST AND ACCURATE NEURAL NETWORK INFERENCE

(71) Applicant: Smart Engines Service, LLC, Moscow (RU)

(72) Inventors: Anton Vsevolodovich Trusov, Moscow (RU); Elena Evgenyevna Limonova, Moscow (RU); Dmitry Petrovich Nikolaev, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 506 days.

(21) Appl. No.: 18/241,469

(22) Filed: Sep. 1, 2023

(65) Prior Publication Data

US 2024/0211763 A1 Jun. 27, 2024

(30) Foreign Application Priority Data

Dec. 22, 2022 (RU) ........................... RU2022133898

(51) Int. Cl.
*G06N 3/082* (2023.01)
*G06N 3/0495* (2023.01)

(52) U.S. Cl.
CPC ........... *G06N 3/082* (2013.01); *G06N 3/0495* (2023.01)

(58) Field of Classification Search
None
See application file for complete search history.

(56) References Cited

U.S. PATENT DOCUMENTS

| | | | | |
|---|---|---|---|---|
| 9,607,241 | B2 * | 3/2017 | Rivet-Sabourin | G06T 7/73 |
| 11,188,817 | B2 * | 11/2021 | Dikici | G06N 3/063 |
| 11,263,518 | B2 * | 3/2022 | Venkataramani | G06N 3/08 |
| 11,475,102 | B2 * | 10/2022 | Jiang | G06F 9/3893 |
| 12,093,816 | B1 * | 9/2024 | Drimbarean | G06N 3/084 |
| 12,572,798 | B1 * | 3/2026 | Sather | G06N 3/048 |
| 2017/0286830 | A1 * | 10/2017 | El-Yaniv | G06F 7/48 |
| 2018/0321347 | A1 * | 11/2018 | Wang | G01R 33/5608 |
| 2019/0138882 | A1 * | 5/2019 | Choi | G06N 3/0464 |

(Continued)

OTHER PUBLICATIONS

Benoit Jacob, Skirmantas Kligys, Bo Chen, Menglong Zhu, Matthew Tang, Andrew Howard, Hartwig Adam, Dmitry Kalenichenko; Proceedings of the IEEE Conference on Computer Vision and Pattern Recognition (CVPR), 2018, pp. 2704-2713 (Year: 2018).*

(Continued)

*Primary Examiner* — Polina G Peach

(74) *Attorney, Agent, or Firm* — Womble Bond Dickinson (US) LLP

(57) ABSTRACT

Given their limited computational resources, mobile or embedded devices may not be capable of operating a full-precision convolutional neural network (CNN). Thus, quantized neural networks (QNNs) may be used in place of a full-precision CNN. For example, 8-bit QNNs have similar accuracy to full-precision CNNs. While lower-bit QNNs, such as 4-bit QNNs, are faster and more computationally efficient than 8-bit QNNs, they are also significantly less accurate. Accordingly, a 4.6-bit quantization scheme is disclosed that produces a 4.6-bit QNN with similar accuracy to an 8-bit QNN, but a speed and computational efficiency that is similar to 4-bit QNNs.

15 Claims, 6 Drawing Sheets

(56) References Cited

U.S. PATENT DOCUMENTS

| | | | | |
|---|---|---|---|---|
| 2020/0026745 | A1* | 1/2020 | Pillai | G06F 9/30076 |
| 2020/0074304 | A1* | 3/2020 | Landola | G06N 3/0495 |
| 2020/0082269 | A1* | 3/2020 | Gao | G06N 5/04 |
| 2020/0218982 | A1* | 7/2020 | Annau | G06N 3/063 |
| 2020/0272881 | A1* | 8/2020 | Lo | G06F 17/16 |
| 2021/0019630 | A1* | 1/2021 | Yao | G06F 18/2148 |
| 2021/0089925 | A1* | 3/2021 | Partovi Nia | G06N 3/084 |
| 2021/0201117 | A1* | 7/2021 | Ha | G06N 3/08 |
| 2022/0067527 | A1* | 3/2022 | Xu | G06N 3/063 |
| 2022/0067530 | A1* | 3/2022 | Khailany | G06N 3/063 |
| 2022/0129759 | A1* | 4/2022 | Yao | G06N 3/0464 |
| 2023/0068941 | A1* | 3/2023 | Tambe | G06N 3/04 |
| 2023/0106778 | A1* | 4/2023 | Karabutov | G06N 3/08 706/15 |
| 2023/0108629 | A1* | 4/2023 | Liu | G06F 7/5443 708/200 |
| 2023/0229921 | A1* | 7/2023 | Fedorov | G06N 3/0442 706/25 |
| 2023/0306255 | A1* | 9/2023 | Charlaix | G06N 3/063 |
| 2024/0104346 | A1* | 3/2024 | Hou | G06N 3/045 |

OTHER PUBLICATIONS

A. Trusov, E. Limonova, D. Slugin, D. Nikolaev and V. V. Arlazarov, “Fast Implementation of 4-bit Convolutional Neural Networks for Mobile Devices,” 2020 25th International Conference on Pattern Recognition (ICPR), Milan, Italy, 2021, pp. 9897-9903, doi: 10.1109/ICPR48806.2021.9412841. (Year: 2020).*

Esser, S.K., et al., Learned Step Size Quantization, International Conference on Learning Representations, arXiv:1902.08153v3, May 7, 2020, 12 pgs.

Jin, Q., et al., AdaBits: Neural Networks Quantization with Adaptive Bit-Widths, Proceedings of the IEEE/CVF Conference on Computer Vision and Pattern Recognition, Mar. 15, 2020, arXiv:1912.09666v2, 12 pgs.

Lee, D., et al., FleXOR: Trainable Fractional Quantization, 34th Conference on Neural Information Processing Systems (NeurIPS 2020), Vancouver, Canada, Oct. 22, 2020, arXiv:2009.04126v2, 18 pgs.

Jouppi, N.P., et al., In-Datacenter Performance Analysis of a Tensor Processing Unit, To appear at the 44th International Symposium on Computer Architecture (ISCA), Toronto, Canada, Jun. 26, 2017, arXiv:1704.04760v1, 17 pgs.

Anderson, M., et al., First-Generation Inference Accelerator Deployment at Facebook, arXiv:2107.04140v3, Aug. 4, 2021, 13 pgs.

Venkatapuram, P., et al., Custom Silicon at Facebook: A Datacenter Infrastructure Perspective on Video Transcoding and Machine Learning, 2020 IEEE International Electron Devices Meeting (IEDM), 2020, doi: 10.1109/IEDM13553.2020.9372038, 4 pgs.

Zhang, P., et al., High Performance Depthwise and Pointwise Convolutions on Mobile Devices, Proceedings of the AAAI Conference on Artificial Intelligence, 34, Jan. 3, 2020, arXiv:2001.02504v1, 8 pgs.

Elloumi, Y., et al., Fast and Accurate Mobile-Aided Screening System of Moderate Diabetic Retinopathy, International Conference on Machine Vision (ICMV), Nov. 2020, Rome, Italy. hal-02977506, 11 pgs.

Afifi, M., et al., Robust Real-Time Pedestrian Detection on Embedded Devices, 13th International Conference on Machine Vision, Rome, Italy, 2020, 1160529, Jan. 4, 2021, SPIE, the international society for optics and photonics, https://doi.org/10.1117/12.2587097, 7 pgs.

Arlazarov, V.V., et al., MIDV-500: a dataset for identity document analysis and recognition on mobile devices in video stream, Computer Optics, 2019, 43(5), pp. 818-824.

Vanhoucke, V., et al., Improving the speed of neural networks on CPUs, Deep Learning and Unsupervised Feature Learning Workshop, NIPS, 2011, 8 pgs.

GitHub, gemmlowp: a small self-contained low-precision GEMM library, 2017, 8 pgs., [online] URL:github.com/google/gemmlowp.

GitHub, The Ruy matrix multiplication library, 2020, 1 pg., [online] URL: github.com/google/ruy.

GitHub, QNNPACK: Ppen source library for optimized mobile deep learning, 2018, 5 pgs., [online] URL: github.com/pytorch/QNNPACKGitHub.

Choi, S., et al., TernGEMM: GEneral Matrix Multiply Library with Ternary Weights for Fast DNN Inference, 2021 IEEE Workshop on Signal Processing Systems (SiPS), 2021, pp. 111-116.

Zhang, J., daBNN: A Super Fast Inference Framework for Binary Neural Networks on ARM Devices, MM ’19: Proceedings of the 27th ACM International Conference on Multimedia, Oct. 2019, arXiv:1908.05858v1, pp. 2272-2275.

Trusov, A., et al., Fast Implementation of 4-bit Convolutional Neural Networks for Mobile Devices, 2020 25th International Conference on Pattern Recognition (ICPR), Milian, Italy, Jan. 10-15, 2021, pp. 9897-9903.

Won, J., et al., ULPPACK: Fast sub-8-bit Matrix Multiply on Commodity SIMD Hardware, Proceedings of the 5th MLSys Conferences, Santa Clara, California, 2022, 12 pgs.

Cowan, M., et al., Automatic Generation of High-Performance Quantized Machine Learning Kernels, CGO 2020: Proceedings of the 18th ACM/IEEE International Symposium on Code Generation and Optimization, Feb. 22-26, 2020, San Diego, California, https://doi.org/10.1145/3368826.3377912, pp. 305-316.

Jacob, B,., et al., Quantization and Training of Neural Networks for Efficient Integer-Arithmetic-Only Inference, Proceedings of the IEEE Conference on Computer Vision and Pattern Recognition (CVPR), 2018, arXiv:1712.05877v1, pp. 2704-2713.

Banner, R., et al., Post training 4-bit quantization of convolutional networks for rapid-deployment, Advances in Neural Information Processing Systems 32 (NeurIPS 2019), arXiv:1810.05723v3, 16 pgs.

Choukroun, Y., et al., Low-bit Quantization of Neural Networks for Efficient Inference, 2019 IEEE/CVF International Conference on Computer Vision Workshop (ICCVW), arXiv:1902.06822v2, pp. 3009-3018.

Anderson, A., et al., High-Performance Low-Memory Lowering: GEMM-based Algorithms for DNN Convolution, 2020 IEEE 32nd International Symposium on Computer Architecture and High Performance Computing (SBAC-PAD), 2020, pp. 99-106.

Georganas, E., et al., Anatomy of High-Performance Deep Learning Convolutions on SIMD Architectures, SC ’18: Proceedings of the International Conference for High Performance Computing, Networking, Storage, and Analysis, Nov. 2018, 66, arXiv:1808.05567v2, 12 pgs.

Dukhan, M., The Indirect Convolution Algorithm, arXiv:1907.02129v1, 2019, 10 pgs.

Goto, K., et al., Anatomy of High-Performance Matrix Multiplication, ACM Transactions on Mathematical Software (TOMS), 34(3), 2008, 25 pgs.

Zhou, S., et al., DoReFa-NET: Training Low Bitwidth Convolutional Neural Networks With Low Bitwidth Gradients, arXiv:1606.06160v3, 2018, 13 pgs.

Ioffe, S, et al., Batch Normalization: Accelerating Deep Network Training by Reducing Internal Covariate Shift, Proceedings of the 32nd International Conference on Machine Learning, PMLR 37, 2015, arXiv:1502.03167v3, pp. 448-456.

Yin, P., et al., Understanding Straight-Through Estimator in Training Activation Quantized Neural Nets, arXiv:1903.05662v4, 2019, 30 pgs.

Krizhevsky, A., Learning Multiple Layers of Features from Tiny Images, Apr. 8, 2009, 60 pgs.

* cited by examiner

4.6-BIT QUANTIZATION FOR FAST AND ACCURATE NEURAL NETWORK INFERENCE

CROSS-REFERENCE TO RELATED APPLICATIONS

This application claims priority to Russian Application No. 2022133898, filed on Dec. 22, 2022, which is hereby incorporated herein by reference as if set forth in full.

BACKGROUND

Field of the Invention

The embodiments described herein are generally directed to quantized neural networks, and, more particularly, to 4.6-bit quantization of neural networks for fast and accurate inference.

Description of the Related Art

The quantization of neural networks refers to the use of integer weights and/or activations to increase the inference speed of neural networks. Algorithms exist both for training quantized neural networks (QNNs) and for operating QNNs. Recent studies demonstrate a negligible gap in accuracy between QNNs and full-precision neural networks in a number of tasks (Ref1, Ref2, Ref3).

Practical applications benefit not only from the accuracy of QNNs, but also the computational efficiency of QNNs in various environments. For example, data processing centers tend to rely on tensor processors and specialized accelerators (Ref4, Ref5, Ref6), which greatly benefit from QNNs. However, end devices, such as mobile phones and smart gadgets, often perform computations using central processing units (CPUs) (Ref7, Ref8, Ref9, Ref10), which have limited computational resources. Given their limited computational resources, these end devices may not be able to provide high-speed processing.

The most computationally challenging operation in inference by a neural network is matrix multiplication. The computations for both convolutional and fully-connected layers are usually expressed via matrix multiplication. Thus, implementations of QNNs mainly comprise special algorithms for quantized matrix multiplication.

However, CPUs have a predefined general-purpose architecture, which significantly limits the design of algorithms for quantized matrix multiplication. For example, 8-bit QNNs can be efficiently implemented on CPUs, because 8-bit coefficients and 32-bit accumulators are easily processed by single instruction, multiple data (SIMD) instructions (Ref11). Currently, there are efficient implementations for 8-bit QNNs, such as the gemmlowp (Ref12), Ruy (Ref13), and QNNPack (Ref14) libraries. There are also efficient implementations of ternary QNNs (Ref15) and binary QNNs (e.g., the daBNN library described in Ref16). However, binary and ternary QNNs suffers from a significant loss in accuracy, relative to comparable full-precision neural networks and 8-bit QNNs (e.g., having the same architecture and number of parameters). The accuracy of binary and ternary QNNs is not sufficient for some tasks.

Ref17 describes an algorithm for 4-bit quantized multiplication on Advanced Reduced Instruction Set Computer (RISC) Machine (ARM) processors. This algorithm works faster than 8-bit quantized multiplication, but poses a constraint on the depth of multiplication, and therefore, is only applicable to small neural networks. In addition, quantization with lower than 8-bit precision either requires packing and unpacking values into solid bytes of data, or does not occupy all register bits, which introduces additional overhead. Ref18 describes a packing method that allows several inputs or weights to be stored in one register and then processed together in multiplication, thereby increasing efficiency. Ref19 describes a search for an efficient sequence of instructions to implement low-precision matrix multiplication. However, each of these approaches require additional packing and unpacking operations, and only consider an integer number of bits per weight.

SUMMARY

Accordingly, systems, methods, and non-transitory computer-readable media are disclosed for 4.6-bit quantization of neural networks for fast and accurate inference.

In an embodiment, a method comprises using at least one hardware processor to, for one or more layers to be quantized in a neural network: determine a number of quantization bins for weights and a number of quantization bins for activations that ensure that a product of a quantized weight and a quantized activation coefficient is representable by a signed 8-bit integer; and during training of each of the one or more layers to be quantized in the neural network, quantize weights of the layer into the quantization bins for weights.

Matrix multiplication in each of the one or more layers may comprise: over a plurality of iterations in an inner loop, accumulating products of matrix multiplication, on blocks representing reordered subsets of values from left and right matrices, into inner accumulators; and over one or more iterations of an outer loop, accumulating the accumulated products from the plurality of iterations in the inner loop in outer accumulators. Each of the inner accumulators may be 16 bits. Each of the inner accumulators may be stored in a register of the at least one hardware processor. The at least one hardware processor may comprise an Advanced Reduced Instruction Set Computer Machine (ARM) processor. The products of matrix multiplication may be computed using Single Instruction, Multiple Data (SIMD) instructions. Each of the outer accumulators may be 32 bits. Each of the outer accumulators may be stored in a Level 1 (L1) cache of the at least one hardware processor. The outer loop may comprise a plurality of iterations, and a number of the plurality of iterations in the outer loop may be limited to no more than 258 iterations.

The method may further comprise using the at least one hardware processor to, after the training, store the quantized weights of the one or more layers. The method may further comprise using the at least one hardware processor to, after the training, deploy the neural network, as a quantized neural network, including the quantized weights, to an application for execution on a mobile or embedded device.

The method may further comprise using the at least one hardware processor to quantize each of the one or more layers to be quantized in the neural network by: training the layer without quantizing inputs to the layer; collecting a histogram of the inputs to the layer; determining input quantization parameters that minimize quantization error for the inputs to the layer based on the histogram; quantizing the inputs to the layer channel by channel using the input quantization parameters; determining weight quantization parameters that minimize quantization error for weights of the layer; quantizing the weights of the layer filter by filter using the weight quantization parameters; and quantize a bias of the layer based on one or both of the input quantization parameters and the weight quantization parameters. In an embodiment, the input quantization parameters are frozen after being determined. In an embodiment, the weights and the bias of the layer are not frozen during the quantization. The method may further comprise using the at least one hardware processor to, during quantization of each of the one or more layers to be quantized in the neural network, fine-tune the layer: after quantizing the inputs to the layer and before determining the weight quantization parameters; after quantizing the weights of the layer and before quantizing the bias of the layer; and after quantizing the bias of the layer.

The number of quantization bins for weights may be between 9 and 37. The number of quantization bins for weights may be between 13 and 29. For the one or more layers to be quantized in the neural network, a pairing ($N_w$, $N_x$) of the number ($N_w$) of quantization bins for weights and the number ($N_x$) of quantization bins for activations may be one of: (127, 5); (85, 7); (63,9); (51,11); (43,13); (37,15); (31,17); (29,19); (25,21); (23,23); (21,25); (19, 29); (17, 31); (15, 37); (13,43); (11, 51); (9, 63); (7,85); and (5, 127).

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for 4.6-bit quantization of neural networks for fast and accurate inference. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

Figure 1:
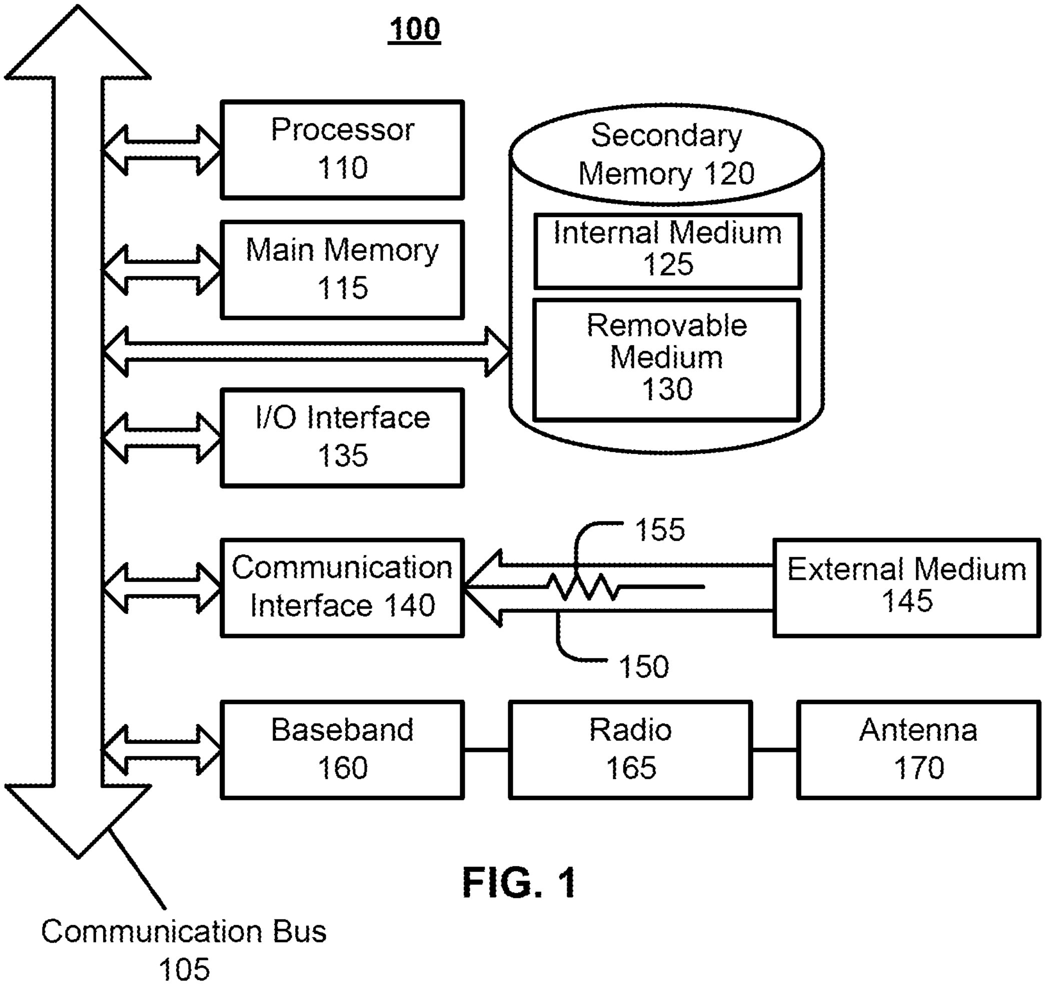
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used as or in conjunction with one or more of the functions, processes, or methods (e.g., to store and/or execute one or more software modules) described herein. System 100 can be a server or any conventional personal computer, or any other processor-enabled device that is capable of wired or wireless data communication. Other computer systems and/or architectures may be also used, as will be clear to those skilled in the art.

System 100 preferably includes one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 100 preferably includes a main memory 115 and may also include a secondary memory 120. Main memory 115 provides storage of instructions and data for programs executing on processor 110, such as one or more of the functions and/or modules discussed herein. It should be understood that programs stored in the memory and executed by processor 110 may be written and/or compiled according to any suitable language, including without limitation C/C++, Java, JavaScript, Perl, Visual Basic, NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 is a non-transitory computer-readable medium having computer-executable code (e.g., any of the software disclosed herein) and/or other data stored thereon. The computer software or data stored on secondary memory 120 is read into main memory 115 for execution by processor 110. Secondary memory 120 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 include an external hard disk drive, an external optical drive, an external magneto-optical drive, and/or the like.

As mentioned above, system 100 may include a communication interface 140. Communication interface 140 allows software and data to be transferred between system 100 and external devices (e.g. printers), networks, or other information sources. For example, computer software or data may be transferred to system 100, over one or more networks (e.g., including the Internet), from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 115 and/or secondary memory 120. Computer-executable code can also be received via communication interface 140 and stored in main memory 115 and/or secondary memory 120. Such computer-executable code, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125 and/or removable medium 130), external storage medium 145, and any peripheral device communicatively coupled with communication interface 140 (including a network information server or other network device). These non-transitory computer-readable media are means for providing software and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 100 may also include optional wireless communication components that facilitate wireless communication over a voice network and/or a data network (e.g., in the case of a mobile device, such as a smart phone). The wireless communication components comprise an antenna system 170, a radio system 165, and a baseband system 160. In system 100, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 decodes the signal and converts it to an analog signal. Then the signal is amplified and sent to a speaker. Baseband system 160 also receives analog audio signals from a microphone. These analog audio signals are converted to digital signals and encoded by baseband system 160. Baseband system 160 also encodes the digital signals for transmission and generates a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 is also communicatively coupled with processor(s) 110. Processor(s) 110 may have access to data storage areas 115 and 120. Processor(s) 110 are preferably configured to execute instructions (i.e., computer programs, such as the disclosed software) that can be stored in main memory 115 or secondary memory 120. Computer programs can also be received from baseband processor 160 and stored in main memory 110 or in secondary memory 120, or executed upon receipt. Such computer programs, when executed, can enable system 100 to perform the various functions of the disclosed embodiments.

2. Process Overview

Embodiments of processes for 4.6-bit quantization of neural networks for fast and accurate inference will now be described in detail. It should be understood that the described processes may be embodied in one or more software modules that are executed by one or more hardware processors (e.g., processor 110), for example, as a computer program or software package. The described processes may be implemented as instructions represented in source code, object code, and/or machine code. These instructions may be executed directly by hardware processor(s) 110, or alternatively, may be executed by a virtual machine operating between the object code and hardware processor(s) 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Quantization Scheme

In quantization, real (e.g., floating-point) values are approximated by integer values. This reduces the memory footprint for the neural network and simplifies computations during operation (i.e., inference) of the resulting QNN. The quantization scheme in Ref20 is based on the affine mapping between a real value r and an integer value q:

$$r = S(q - Z) \tag{1}$$

which can expressed as:

$$q = \left[\frac{r}{S} + Z\right]$$

wherein [·] represents rounding to the nearest integer (e.g., representing a quantization bin), S is a real value representing a scale factor, and Z is an integer value representing the zero-point (also known as the quantization bias or offset). The zero-point represents the quantized value that will represent the real-value zero. S and Z are the parameters of quantization.

The gemmlowp (Ref12) and QNNPack (Ref14) libraries use the quantization scheme in Ref20 to map the real values of matrices to 8-bit unsigned integers as follows:

$$q = \min\left(q_{max}, \max\left(q_{min}, \left[Z + \frac{r}{S}\right]\right)\right) \tag{2}$$

wherein [•] represents rounding to the nearest integer, $q_{min}=0$, and $q_{max}=255$ for 8-bit quantization. In Ref17, Ref21, and Ref22, the same quantization scheme is used for 4-bit quantization with $q_{min}=0$ and $q_{max}=15$. It should be understood that, more generally, $q_{max}=2^n-1$, wherein n is the bit-width of the quantization.

2.2. Quantized Matrix Multiplication

For purposes of description, it will be assumed that matrix multiplication involves multiplying two real-valued matrices A and B to obtain a real-valued matrix C. In other words, $A_{M\times K}B_{K\times N}=C_{M\times N}$. During quantization, matrices A and B are approximated by integer-valued matrices $\hat{A}$ and $\hat{B}$, respectively. Matrix A is quantized into matrix $\hat{A}$ using parameters $S_A$ and $Z_A$, and matrix B is quantized into matrix $\hat{B}$ using parameters $S_B$ and $Z_B$, using the above quantization scheme. In this case, matrix C can be approximated by matrix $\hat{C}$ using parameters $S_C=S_AS_B$ and $Z_C=0$:

$$c_{ij} = \sum_k a_{ik}b_{kj} \approx \sum_k (S_a(\hat{a}_{ik}-Z_A)S_b(\hat{b}_{kj}-Z_B)) = S_aS_b\sum_k ((\hat{a}_{ik}-Z_A)(\hat{b}_{kj}-Z_B)) \quad (3)$$

$$\hat{c}_{ij} = \sum_k ((\hat{a}_{ik}-Z_A)(\hat{b}_{kj}-Z_B)) \quad (4)$$

Thus, $\hat{C}$ can be computed with integer-only arithmetic. It should be understood that $\hat{C}$ will be a matrix whose cell values equal $\hat{c}_{ij}$ for each $i\in M$ and $j\in N$. Some algorithms for quantized multiplication (e.g., QNNPack), directly apply this equation for $\hat{c}_{ij}$ to compute $\hat{C}$. Other algorithms (e.g., gemmlowp or the algorithm described in Ref17) use the following approach:

$$\hat{c}_{ij} = \sum_k \hat{a}_{ik}\hat{b}_{kj} - Z_A\sum_k \hat{b}_{kj} - Z_B\sum_k \hat{a}_{ik} + KZ_AZ_B \quad (5)$$

In this case, on the right side of the equation, the first term is the matrix multiplication of the quantized matrices, the second and third terms are easy to compute since each only requires a single matrix, and the fourth term is a constant.

To efficiently compute a neural network, a fast algorithm should be defined for the multiplication of quantized matrices and the quantization parameters S and Z, for the inputs and weights of each layer of the neural network. There are several strategies to choose quantization parameters. For example, the quantization parameters may be set to match the whole range of possible values (Ref20), set to quantize inputs and weights with minimum error (Ref21, Ref22), or directly learned during training of the neural network.

2.3. High-Performance Matrix Multiplication

The major contributors to the performance of a QNN are the matrix multiplication algorithm and the convolution algorithm. However, convolution can often be transformed into a matrix-multiplication process, using image-to-column (im2col) or similar algorithms, without requiring a specific method (Ref23, Ref24, Ref25).

The computational efficiency of an algorithm, executing on a CPU, depends significantly on data locality, since load and store operations in memory are slow. Caches noticeably reduce the significance of this problem. A cache is a hierarchical memory structure that typically comprises two or three levels of cache memory, with each level having different storage capacities and access speeds. Generally, faster access speeds are associated with lower storage capacities. If data from a certain region of memory is loaded into a cache, the data can be accessed significantly faster from the cache than from the memory directly.

A load or store operation of data that are outside the cache (i.e., a cache miss) causes a new region of memory (i.e., storing the data) to be mapped into the cache. This first access of the data, necessitated by the cache miss, requires a notable amount of time. Thus, since the size of the cache is limited, high-performance matrix multiplication should account for the size of the cache. A matrix-multiplication algorithm may load small blocks of m rows from the left matrix A and n columns from the right matrix B, store the values of the blocks in a specific order, and apply a highly optimized function called a "microkernel" to compute a matrix product, having a size of m×n, from the loaded blocks. The result of a plurality of such operations may be accumulated directly in CPU registers, since the blocks are small enough to fit into the caches (Ref26).

If such a matrix-multiplication algorithm is implemented on a CPU with an SIMD extension, it may benefit from the ability to simultaneously compute these matrix products over several values packed into SIMD registers. For example, ARMv8 processors have thirty-two 128-bit CPU registers. Each 128-bit CPU register is capable of holding four 32-bit elements (e.g., integer or floating-point values), eight 16-bit elements, or sixteen 8-bit elements.

Algorithms for quantized matrix multiplication utilize these CPU registers on ARM processors in different manners. For example, gemmlowp (Ref12) implements multiplication of unsigned 8-bit matrices. Eight 8-bit values in the left matrix A are loaded from memory, and extended with zeroes to 16-bit values. Thus, eight 16-bit values are stored in a single 128-bit SIMD register. Then, two instructions, Unsigned Long Multiply-Accumulate Long (UMLAL) and UMLAL2, are executed to multiply the lower and upper halves of the register by two values from the right matrix B, and the result is accumulated in a single 128-bit register as four 32-bit values. In the gemmlowp algorithm, a basic microkernel has a 12×8 shape and accumulates results in twenty-four SIMD registers. If the height of the left matrix A is not a multiple of 12 or the width of the right matrix B is not a multiple of 8, smaller microkernels are used to compute the remaining part.

QNNPack solves the same task, but with three main differences. Firstly, QNNPack performs a subtraction of the zero-point, instead of extending 8-bit values to 16-bit values using zeroes. However, QNNPack still extends the 8-bit values to 16-bit values. Secondly, instead of UMLAL and UMLAL2 instructions, QNNPack executes Signed Integer Multiple-Accumulate Long (SMLAL) and SMLAL2 instructions on signed integers. Thirdly, immediately after accumulation is finished, QNNPack re-quantizes the 32-bit values back to 8-bit values. Other differences of QNNPack, relative to gemmlowp, are caused by the manner in which QNNPack computes convolution without image-to-column transformation and determines the 8×8 shape of the microkernel.

In Ref17, sixteen 4-bit values are stored into sixteen 8-bit values inside the SIMD register. Then, the UMLAL and UMLAL2 instructions are executed to multiply and accumulate the products into 16-bit accumulators. This allows for a microkernel that is twice as big and efficient as the microkernel in gemmlowp. However, 16-bit accumulators pose restrictions on the depth of matrix multiplication, such that the algorithm in Ref17 can only be applied to small QNNs.

In Ref18, several sub-8-bit (i.e., 1-bit to 7-bit) values are packed into 16-bit registers, using the Integer Multiply-Accumulate (MLA) instruction. Then, a bit-mask (AND) is applied, and an Unsigned Integer Shift Right and Accumulate (USRA) instruction is executed to extract the sum of products, once per several multiplications, with the exact number of multiplications between extractions depending on bit-width. The SIMD registers are mainly used with eight 16-bit values during computations.

2.4. Quantized Neural Network Inference

Assuming that the weights of the layers have already been quantized, the simplest manner to implement a QNN is to, for each layer: (i) quantize the floating-point input of the layer according to equation (2); (ii) compute the quantized operation (i.e., multiplication or convolution); and (iii) de-quantize the integer result back to floating-point values according to equation (1). However, this approach is not efficient, because it requires many conversions between integer and floating-point values and the computation of non-linear activations in floating-point values.

To simplify the inference process, quantization and non-linearity can be fused together in sequential quantized layers with partially linear activations, such as a Rectified Linear Unit (ReLU) ($\sigma(x)=\max(0, x)$) or HardTanh ($\sigma(x)=\min(1, \max(-1, x))$). In this manner, the integer output of the first layer is simply re-quantized and passed to the next layer without de-quantization, activation, or the subsequent quantization. Moreover, the re-quantization itself can be fused into the computation of matrix multiplication or convolution (Ref20, Ref14).

2.5. 4.6-Bit Quantization

A key feature that enables the 4-bit matrix multiplication algorithm in Ref17 to be faster than the 8-bit matrix multiplication algorithm in gemmlowp (Ref12) is that the 4-bit matrix multiplication algorithm in Ref17 operates on 8-bit values (i.e., sixteen per 128-bit SIMD register) instead of 16-bit values (i.e., only eight per 128-bit SIMD register), and accumulates the result in 16-bit accumulators, instead of in 32-bit accumulators. This is possible because the product of 4-bit values fit into 8-bit registers. In 4-bit quantization, the quantized value q satisfies the inequality $$q_{min} = 0 \le q \le q_{max} = 15.$$

Consider signed matrix multiplication of two quantized values x and w whose product is a signed 8-bit integer:

$$\begin{gathered} -128 \le xw \le 127 \\ |x| \le x_{max} \\ |w| \le w_{\max} \end{gathered} \tag{6}$$

This scheme allows for $N_x=2x_{max}+1$ quantization bins for x, and $N_w=2w_{max}+1$ quantization bins for w. There are nineteen pairs of ($N_x$, $N_w$) that satisfy Inequalities (6): (127, 5); (85, 7); (63,9); (51,11); (43,13); (37,15); (31,17); (29, 19); (25, 21); (23, 23); (21,25); (19,29); (17,31); (15,37); (13,43); (11,51); (9,63); (7,85); and (5,127). The average number of bits required to store x and w, computed from $(\log_2(N_x)+\log_2(N_w))/2$, is in the range of 4.51 to 4.79. Hence, disclosed embodiments are referred to as "4.6-bit quantization" or could alternatively be referred to as "sub-5-bit quantization."

4.6-bit quantization allows for more quantization bins than the sixteen quantization bins allowed by 4-bit quantization. As a result, the disclosed 4.6-bit quantization allows for a more accurate approximation of floating-point multiplication by quantized multiplication than 4-bit quantization, while having the same computational efficiency as 4-bit quantization. The only difference in computational efficiency is that unsigned operations are replaced by signed operations.

One significant restriction in 4-bit quantization (Ref17), mentioned above, is the limitation on the depth of matrix multiplication, which is required to prevent overflow during computations. In an embodiment, to resolve this issue, the inner loop of the matrix multiplication is split into two stages. In the first stage, an inner loop accumulates the results of matrix multiplication inside 16-bit integers, in no more than $[(2^{15}-1)/127]=258$ iterations. In the second stage, an outer loop sums the accumulated results into 32-bit integers stored in memory. Due to additional load or store operations and a bigger memory footprint, this algorithm should be less efficient than 4-bit matrix multiplication (Ref17), but still significantly faster than the 8-bit matrix multiplication in Ref12.

2.6. Implementation of 4.6-bit Quantization

Figure 2A:
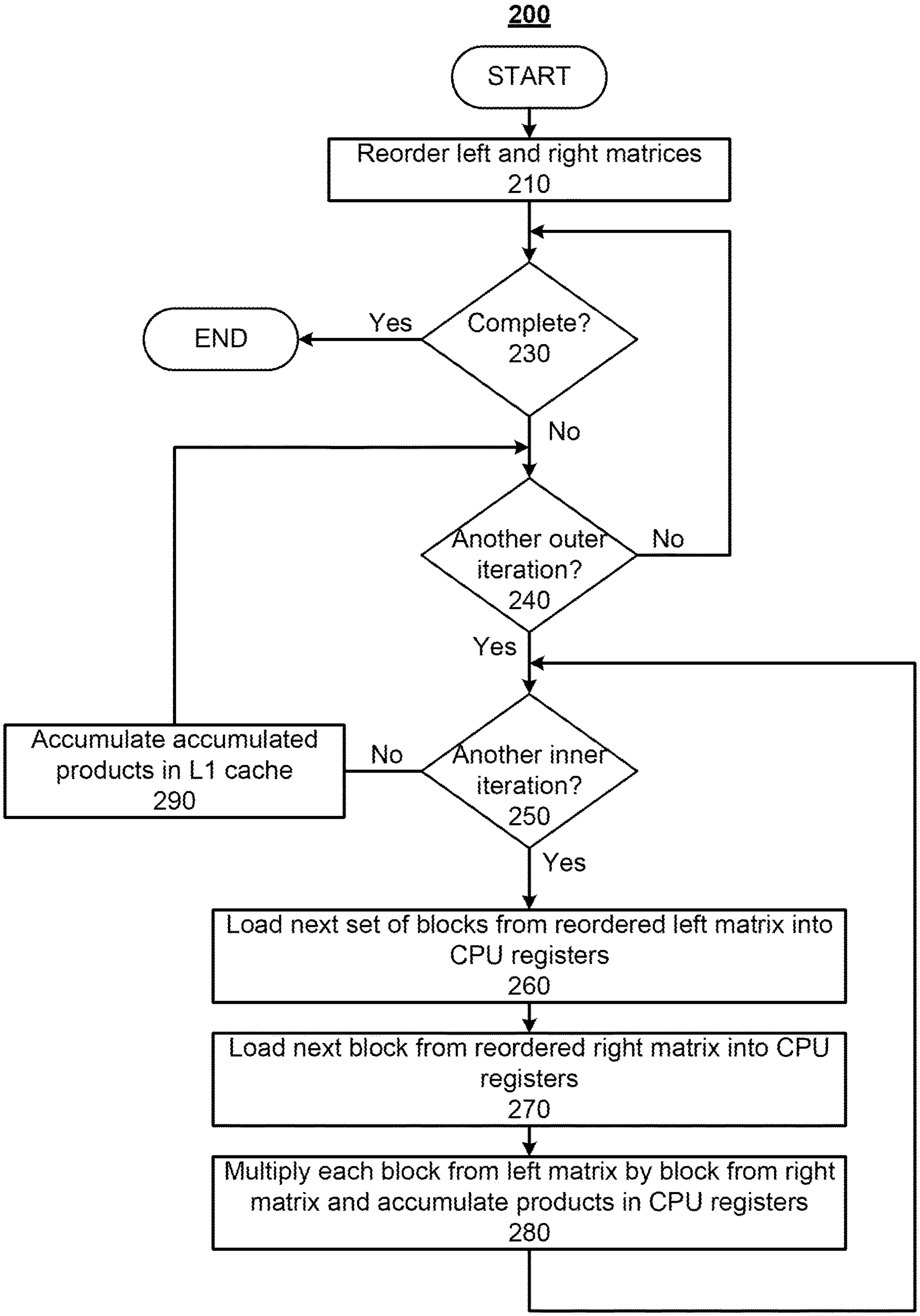
FIGS. 2A and 2B illustrate a main microkernel for 4.6-bit matrix multiplication, according to an embodiment.

FIG. 2A illustrates a process 200 for a main microkernel for 4.6-bit matrix multiplication on an ARM processor, according to an embodiment. Initially, in subprocess 210, the right and left matrices may be reordered to place the matrix elements into the order in which they will be processed as blocks. Advantageously, this enables the matrix elements to be processed more efficiently using the CPU registers and Level 1 (L1) cache of the ARM architecture.

Figure 2B:
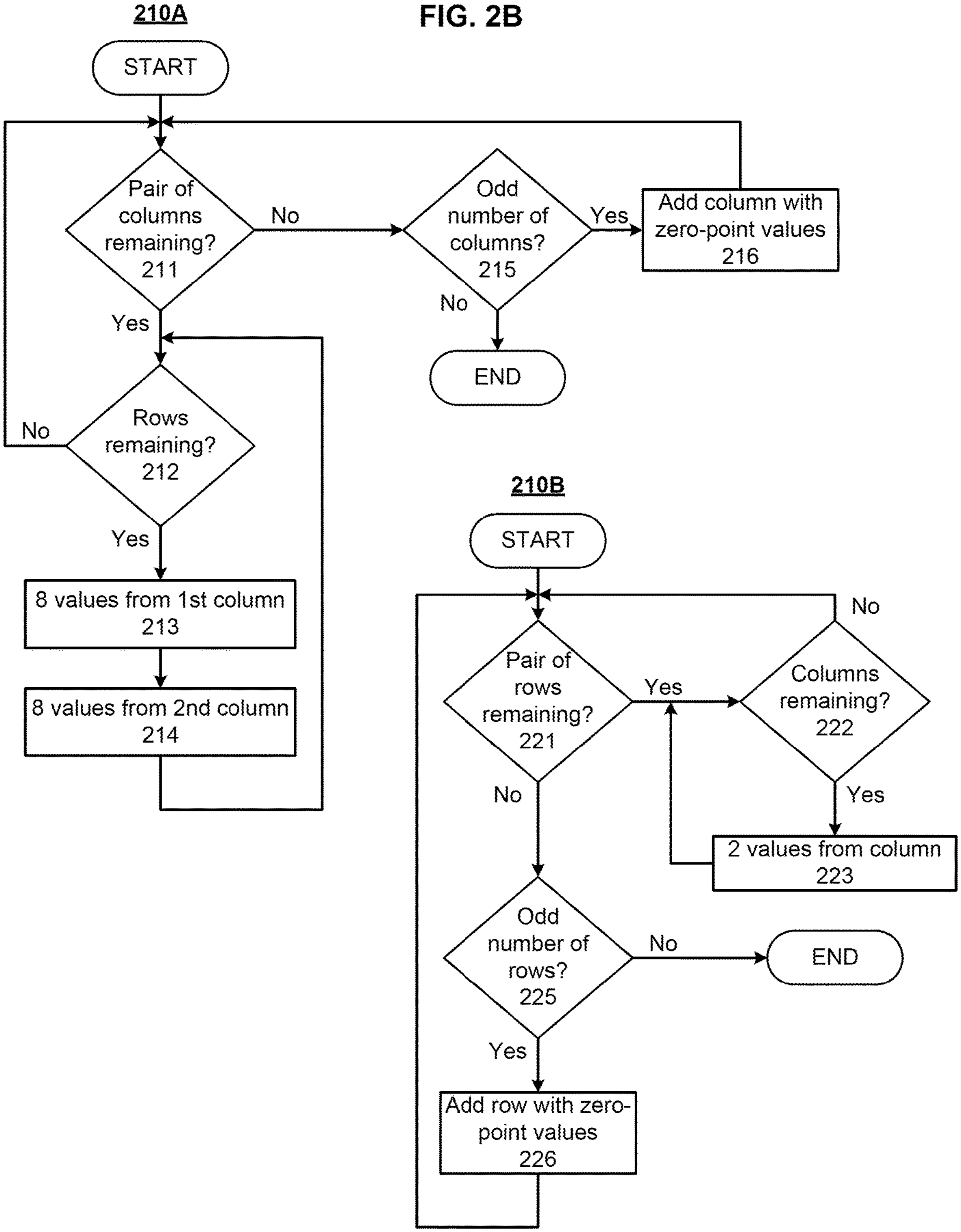

FIG. 2B illustrates an example of the reordering for a microkernel in subprocess 210, according to an embodiment. In this example, products are calculated between 8×2 blocks from the left matrix and 2×n blocks (e.g., 2×8). However, it should be understood that subprocess 210 may be adapted for other block shapes and microkernel shapes. Subprocess 210 comprises both process 210A and 210B. Process 210A reorders the left matrix into reordered data for the left matrix, and process 210B reorders the right matrix into reordered data for the right matrix. Processes 210A and 210B can be performed in any order or in parallel.

Turning to process 210A, in subprocess 211, if another pair of columns remain in the left matrix (i.e., "Yes" in subprocess 211), process 210A proceeds to subprocess 212. Otherwise, if no pair of columns remains in the left matrix (i.e., "No" in subprocess 211), process 210A proceeds to subprocess 215.

In subprocess 212, if more rows remain in the left matrix (i.e., "Yes" in subprocess 212), process 210A proceeds to subprocess 213. Otherwise, if no rows remain in the left matrix (i.e., "No" in subprocess 212), process 210A returns to subprocess 211.

In subprocess 213, eight values (e.g., eight 8-bit values) from the first column in the current pair of columns are added to the reordered data for the left matrix. Then, in subprocess 214, eight values (e.g., eight 8-bit values) from the second column in the current pair of columns are added to the reordered data for the left matrix. Then, process 210A returns to subprocess 212 to determine whether any more rows remain in the left matrix. In an embodiment, the number of rows in the left matrix is a multiple of eight (e.g., 24).

In subprocess 215, if the number of columns in the left matrix is odd (i.e., "Yes" in subprocess 215), such that no pair of columns remains, but a single column remains in the left matrix, a single column may be added to the left matrix in subprocess 216. This single added column may be filled with the zero-point value in subprocess 216. Then, process 210A may return to subprocess 211 to reorder the last pair of columns in the left matrix, including the added column. Once no columns remain in the left matrix (i.e., "No" in subprocess 215), process 210A ends.

Turning to process 210B, in subprocess 221, if another pair of rows remain in the right matrix (i.e., "Yes" in subprocess 221), process 210B proceeds to subprocess 222. Otherwise, if no pair of rows remain in the right matrix (i.e., "No" in subprocess 221), process 210B proceeds to subprocess 225.

In subprocess 222, if more columns remain in the right matrix (i.e., "Yes" in subprocess 222), process 210B proceeds to subprocess 223. Otherwise, if no columns remain in the right matrix (i.e., "No" in subprocess 222), process 210B returns to subprocess 221.

In subprocess 223, two values (e.g., two 8-bit values) from the current column of the right matrix are added to the reordered data for the right matrix. Then, process 210B returns to subprocess 222 to determine whether any more columns remain in the right matrix. In an embodiment, the number of columns in the right matrix is eight or another multiple of eight.

In subprocess 225, if the number of rows in the right matrix is odd (i.e., "Yes" in subprocess 225), such that there is no pair of rows, but a single row remains in the right matrix, a single row may be added to the right matrix in subprocess 226. This single added row may be filled with the zero-point value in subprocess 226. Then, process 210B may return to subprocess 221 to reorder the last pair of rows in the right matrix, including the added row. Once no rows remain in the right matrix (i.e., "No" in subprocess 225), process 210B ends.

Returning to overarching process 200, in subprocess 230, it is determined whether or not the matrix multiplication for a given convolutional layer is complete. The microkernel may be applied to an entire convolutional layer which may have a depth K of thousands or tens of thousands of values, for example, in the case of a residual neural network (ResNet). Thus, this loop, formed by subprocess 230, may apply the microkernel iteratively, such that each iteration maximizes the amount of matrix multiplication that is performed, while guaranteeing that the signed 16-bit accumulators in the CPU registers do not overflow. In the case of the 24×8 microkernel described herein, the maximum number of iterations of matrix multiplication that can be performed in the loop, formed by subprocess 240, is two-hundred-fifty-eight (i.e., 258).

If it is determined that the matrix multiplication for the convolutional layer is complete (i.e., "Yes" in subprocess 230), process 200 may end. Otherwise, if it is determined that the matrix multiplication for the convolutional layer is not complete (i.e., "No" in subprocess 230), process 200 proceeds to subprocess 240 to perform a two-stage loop of matrix multiplications.

In subprocess 240, it is determined whether or not another iteration of an outer loop, formed by subprocess 240, is required to complete the current iteration of the loop formed by subprocess 230. If another iteration of the outer loop is required (i.e., "Yes" in subprocess 240), process 200 proceeds to subprocess 250. Otherwise, if the current iteration of the overarching loop formed by subprocess 230 is complete (i.e., "No" in subprocess 240), process 200 returns to subprocess 230 to either execute another iteration of the overarching loop or end.

In subprocess 250, it is determined whether or not another iteration of an inner loop, formed by subprocess 250, is required to complete the current iteration of the outer formed by subprocess 240. If another iteration of the inner loop is required (i.e., "Yes" in subprocess 250), process 200 proceeds to subprocess 260. Otherwise, if the current iteration of the outer loop formed by subprocess 240 is complete (i.e., "No" in subprocess 250), process 200 proceeds to subprocess 290, and then returns to subprocess 240 to either execute another iteration of the outer loop or end.

In subprocess 260, the next set of blocks of values from the reordered data from the left matrix are loaded into the CPU registers. In addition, in subprocess 270, the next block of values from the reordered data from the right matrix are loaded into the CPU registers. It should be understood that subprocesses 260 and 270 may be performed in any order or in parallel.

In subprocess 280, each loaded block from the reordered data from the left matrix is multiplied with the loaded block from the reordered data from the right matrix. The product of each multiplication is accumulated in the CPU registers. For example, the products may be accumulated in 16-bit accumulators in the CPU registers.

In subprocess 290, the accumulated products are accumulated in the L1 cache of the CPU, and process 200 returns to subprocess 240. For example, the accumulated products may be accumulated in 32-bit accumulators in the L1 cache.

Algorithm 1 below depicts one implementation of process 200, representing the main microkernel for 4.6-bit matrix multiplication on an ARM processor. ARM intrinsic pseudo-code is used to simplify the description of the algorithm. In practice, assembly code may be used to ensure that all registers are used efficiently. The main microkernel has a 24×8 shape. Microkernels with shapes of 24×4, 1×8, 1×4, 24×1, and 1×1 (dot product) may also be implemented to ensure that matrix multiplication could be computed for matrices of arbitrary sizes.

Algorithm 1

```
Input
K: depth of matrix multiplication
A: 8-bit-integer block of 24 x k left matrix, stored in specific order:
        1. first 8 values from first column
        2. first 8 values from second column
        3. second 8 values from first column
        4. second 8 values from second column
        5. third 8 values from first column
        6. third 8 values from second column
        7. repeat 1.-6. for all remaining pairs of columns
        If odd no. of columns, last column is filled with zero-point value
B: 8-bit-integer block of k x 8 right matrix, stored in specific order:
        1. two values from each column, in order from 1st to 8th column
        2. repeat 1. for all remaining pairs of rows
        If odd no. of rows, last row is filled with zero-point value
Output
C: 32-bit integer 24 x 8 matrix (C=AB)
for int r0←0; r0<K; r0←r0+258 do
    int8x16_t a[3], b;
    int8x8_t t[4];
    int16x8_t c[3][8]←0;
    int n←min (258, K−r0);
    for int r1←0; r1<n; r1←r1+2 do
        b ← next 16 values from B;
        a[0] ← next 16 values from A;
        a[1] ← next 16 values from A;
        a[2] ← next 16 values from A;
        for int j←0; j<16; j←j+4 do
            t[0] ← vdup_laneq_s8(b,j+0);
            t[1] ← vdup_laneq_s8(b,j+1);
            t[2] ← vdup_laneq_s8(b,j+2);
            t[3] ← vdup_laneq_s8(b,j+3);
            for int i←0; i<3; i←i+1 do
                c[i][j/2+0] ←
                    vmlal_s8(c[i][j/2+0],vget_low_s8(a[i]),t[0]);
                c[i][j/2+0] ←
                    vmlal_s8(c[i][j/2+0],vget_high_s8(a[i]),t[1]);
                c[i][j/2+1] ←
                    vmlal_s8(c[i][j/2+1],vget_low_s8(a[i]),t[2]);
                c[i][j/2+1] ←
                    vmlal_s8(c[i][j/2+1],vget_high_s8(a[i]),t[3]);
            end
        end
```

-continued

Algorithm 1

```
23        load values from C;
24        addition of corresponding values from c;
25        store result to C;
26    end
27  end
```

Notably, the for-loop formed by lines 01-27 corresponds to the overarching loop formed by subprocess 230 in process 200, the for-loop formed by lines 06-26 corresponds to the outer loop formed by subprocess 240 in process 200, and the for-loop formed by lines 11-22 corresponds to the inner loop formed by subprocess 250 in process 200.

In a particular implementation, the right matrix $\hat{B}$ represents weights in the neural network. The distribution of weights in a trained neural network is usually zero-symmetrical, as is the range of possible values in the quantization scheme. This is why the zero-point $Z_b$ of the right matrix $\hat{B}$ is set to constant zero. In this case, Equation (5) can be significantly simplified to:

$$\hat{c}_{ij} = \sum_k \hat{a}_{ik}\hat{b}_{kj} - Z_A \sum_k \hat{b}_{kj}$$

The sums over columns of right matrix $\hat{B}$ can be computed offline. Thus, during inference, these sums only need to be multiplied by $Z_A$ and subtracted from the bias, which is also added channel-wise in the neural network.

The reordering of right matrix $\hat{B}$, required for the microkernel (i.e., Algorithm 1) can also be done offline. However, the reordering of left matrix $\hat{A}$ must be performed during inference. Thus, matrix multiplication requires additional memory to hold the reordered rows of left matrix $\hat{A}$ for the microkernel. Fortunately, the amount of additional memory required is small (e.g., no more than twenty-four rows), and therefore, only needs to be allocated once and can then be reused.

2.7. Quantized Layer in Training and Inference States

Figure 3:
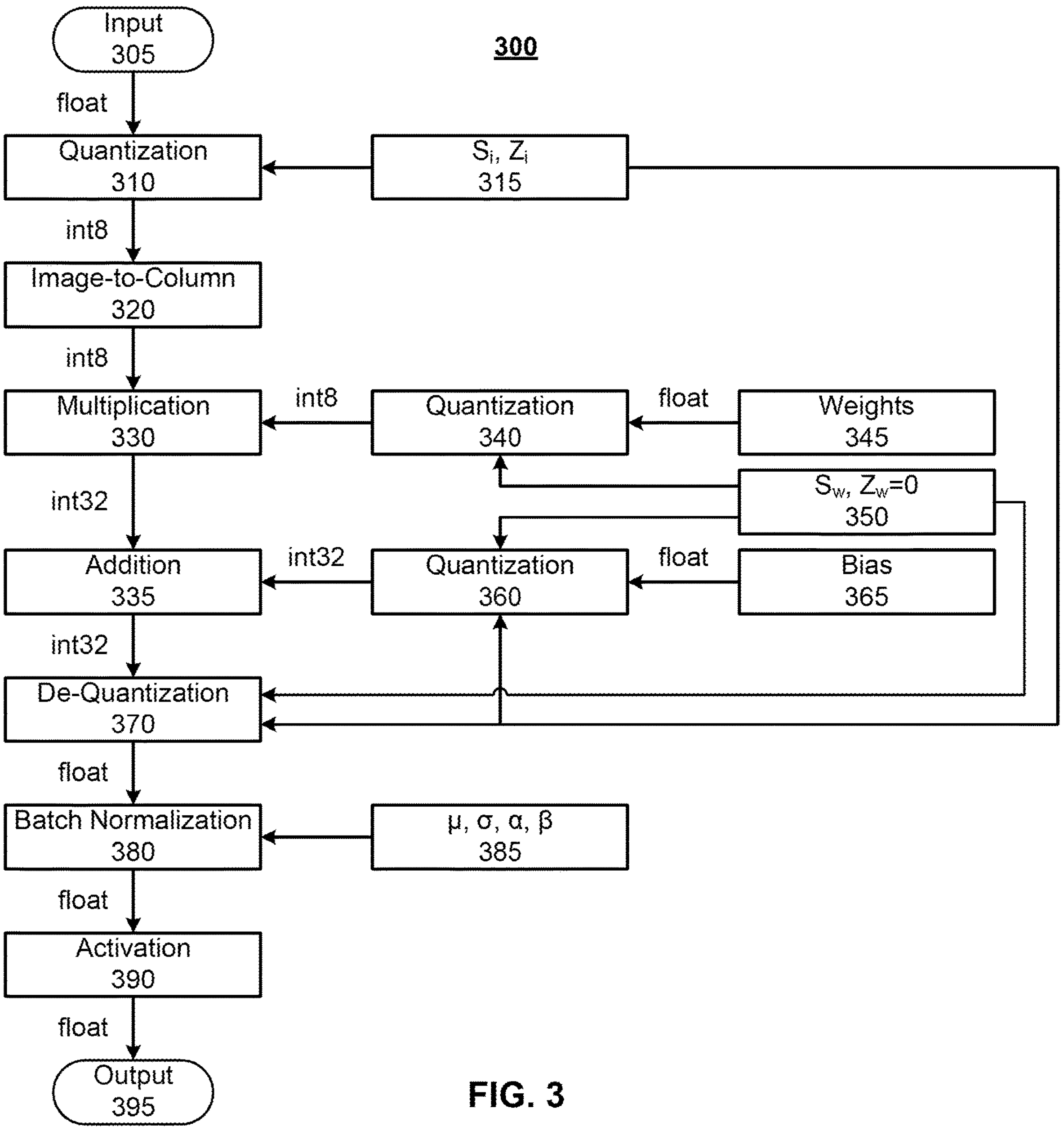
FIG. 3 illustrates a quantization architecture for training one convolutional layer of a 4.6-bit QNN, according to an embodiment.

FIG. 3 illustrates a quantization architecture 300 for training one convolutional layer of a 4.6-bit QNN, according to an embodiment. It should be understood that the illustrated quantization architecture 300 is an example, and that other quantization architectures may be used in place of quantization architecture 300. Quantization architecture 300 may be applied to each convolutional layer to be quantized. The same architecture may be applied to the fully-connected layer, but without image-to-column transformation 320. There may be other layers within the neural network that are not quantized. For example, in many cases, the first and last layers are not quantized (Ref21, Ref27).

As illustrated, a quantization module 310 quantizes floating-point values in input 305 into integer values (e.g., 8-bit integer values), based on quantization parameters 315, comprising or consisting of scale factor $S_i$ and zero-point $Z_i$. An image-to-column (im2col) transformation 320 may be applied to these quantized input values.

In addition, quantization module 340 quantizes floating-point values in weights 345 into integer values (e.g., 8-bit integer values), based on quantization parameters 350, comprising or consisting of scale factor $S_w$ and zero-point $Z_w$. In an embodiment, $Z_w$=0. Furthermore, quantization module 360 quantizes floating-point values in bias 365 into integer values (e.g., 32-bit integer values), based on quantization parameters derived from quantization parameters 315 and/or 350.

Multiplication module 330 may be applied to the output of image-to-column transformation 320, based on the quantized weights output by quantization module 340. The products (e.g., 32-bit integers) of multiplication module 330 may be added by addition module 335, based on the quantized bias output by quantization module 360.

De-quantization module 370 may de-quantize integer values (e.g., 32-bit integer values), output by addition module 335, into floating-point values, based on quantization parameters 315 and quantization parameters 350.

Batch normalization 380 may be applied to the output of de-quantization module 370, based on normalization parameters 385. In an embodiment, for convenience, batch normalization (Ref28) is applied layer-wise, instead of channel-wise. In this case, batch normalization module 380 only has four normalization parameters 385. These parameters consist of the estimated mean μ, the estimated standard deviation σ, and two trainable parameters α and β. For each input value x, batch normalization 380 computes:

$$y = \alpha\frac{x-\mu}{\sigma} + \beta$$

Activation function 390 is applied to the output of batch normalization 380 to produce the output 395 of the convolutional layer. The input to activation function 390 and the output 395 from activation function 390 may be floating-point values.

Figure 4:
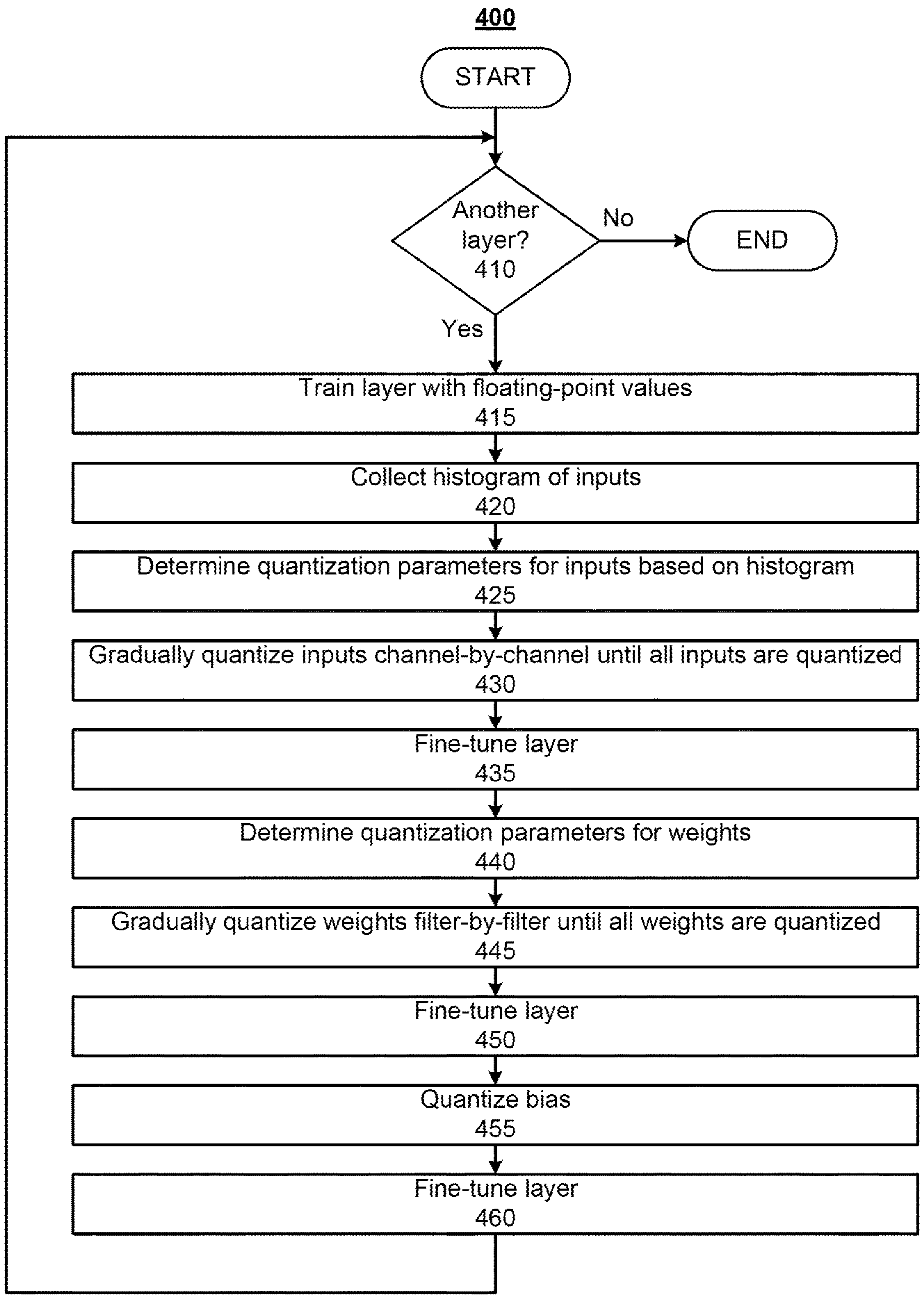
FIG. 4 illustrates a training process for quantizing a neural network, according to an embodiment.

FIG. 4 illustrates a training process 400 for quantizing a neural network, according to an embodiment. Training process 400 may utilize quantization architecture 300. In subprocess 410, it is determined whether or not another layer of the neural network is to be quantized. It should be understood that the loop formed by subprocess 410 may be performed for each layer of the neural network to be quantized. These layers may be a portion or all of the layers of the neural network, and will generally include at least all of the convolutional layers of the neural network. If another layer remains to be quantized (i.e., "Yes" in subprocess 410), process 400 proceeds to subprocess 415. Otherwise, if no layers remain to be quantized (i.e., "No" in subprocess 410), process 400 may end.

Initially, in subprocess 415, the current layer may be trained without quantization being applied. During this initial training, a histogram, representing the distribution of inputs 305, is collected in subprocess 420. Then, quantization parameters 315, comprising or consisting of the values of $S_i$ and zero-point $Z_i$ that minimize the quantization error for inputs 305, are determined based on the histogram in subprocess 425. After subprocess 425, the values of $S_i$ and $Z_i$ are fixed or frozen for the current layer.

In subprocess 430, quantization begins. During quantization, inputs 305 to the convolutional layer are gradually replaced with their quantized approximations by quantization module 310, using fixed quantization parameters 315. For example, floating point values of inputs 305 may be replaced with 8-bit-integer approximations. In an embodiment, inputs 305 are quantized channel by channel. For example, only a few channels of inputs 305 are replaced with their quantized approximations at first, then over a plurality of iterations, more and more channels of inputs 305 are replaced with their quantized approximations, until eventually all of the channels of inputs 305 have been replaced with their quantized approximations. In a particular implementation, this quantization of channels was performed over forty epochs.

In subprocess 435, the current layer is fine-tuned. In a particular implementation, this fine-tuning was performed for ten epochs. Then, in subprocess 440, quantization parameters 350, are determined. Quantization parameters 350 comprise or consist of the value of $S_w$ that minimizes the quantization error for weights 345, as well as $Z_x=0$.

In subprocess 445, weights 345 are gradually replaced with their quantized approximations by quantization module 340, using quantization parameters 350. For example, floating point values of weights 345 may be replaced with 8-bit-integer approximations. In an embodiment, weights 345 are quantized filter by filter. For example, only a few filters are replaced with their quantized approximations at first, then over a plurality of iterations, more and more filters are replaced with their quantized approximations, until eventually all of the filters have been replaced with their quantized approximations. In a particular implementation, this quantization of filters was performed over one-hundred epochs.

In subprocess 450, the current layer is fine-tuned again. In a particular implementation, this fine-tuning was performed for ten epochs. Then, in subprocess 455, bias 365 is quantized by quantization module 360 based on quantization parameters derived from quantization parameters 315 and/or 350. In an embodiment, the quantization parameters, used by quantization module 360, comprise scale factor $S_b=S_xS_w$ and zero-point value $Z_b=0$. Notably, quantized approximations of bias 365 are not limited to minimum and maximum values, since they will always fit within a 32-bit signed integer. After the quantization of bias 365, batch normalization 380 may be deleted. Instead, the output of de-quantization module 370 may be multiplied by $S_n=\alpha/\sigma$, and $Z_b=[(\beta\sigma/\alpha-\mu)/(S_xS_w)]$ may be added to the bias.

In subprocess 460, the current layer is fine-tuned once again. In a particular implementation, this fine-tuning was performed for ten epochs. Then, process 400 returns to subprocess 410 to either quantize another layer or end.

In subprocesses 445 and 455, weights 345 and bias 365, respectively, are quantized, but are not frozen. Rather, weights 345 and bias 365 are updated using straight-through estimation (STE) of gradient (Ref29). This allows for the fine-tuning of the neural network even after quantization of the layer has been completed. However, fine-tuning of the whole neural network using STE is generally ineffective, because it is computationally challenging and unstable.

2.8. Deployment

Once trained, embodiments of the 4.6-bit QNN may be deployed to a device for operation. Although the device may be any device (e.g., smartphones, tablet computers, personal computers, servers, etc.), QNNs are generally most beneficial for resource-constrained devices. Examples of resource-constrained devices, to which the QNN may be deployed, are mobile devices (e.g., smart phones), SoC devices, IoT devices, or other devices that utilize ASICs, FPGAs, and/or low-power CPUs that are not sufficiently efficient to operate large CNNs.

Once deployed to the device, the QNN may be operated on the device to perform inference. In particular, the QNN may be applied to an input to predict, forecast, classify, or otherwise infer an output. It should be understood that the QNN may be used in any context and for any application in which a CNN would be appropriate. Examples of such applications include, without limitation, image or object recognition or classification (e.g., for computer vision), facial recognition, document analysis, video analysis, natural language processing, anomaly detection, time series forecasting, drug forecasting, gaming, and the like.

Figure 5:
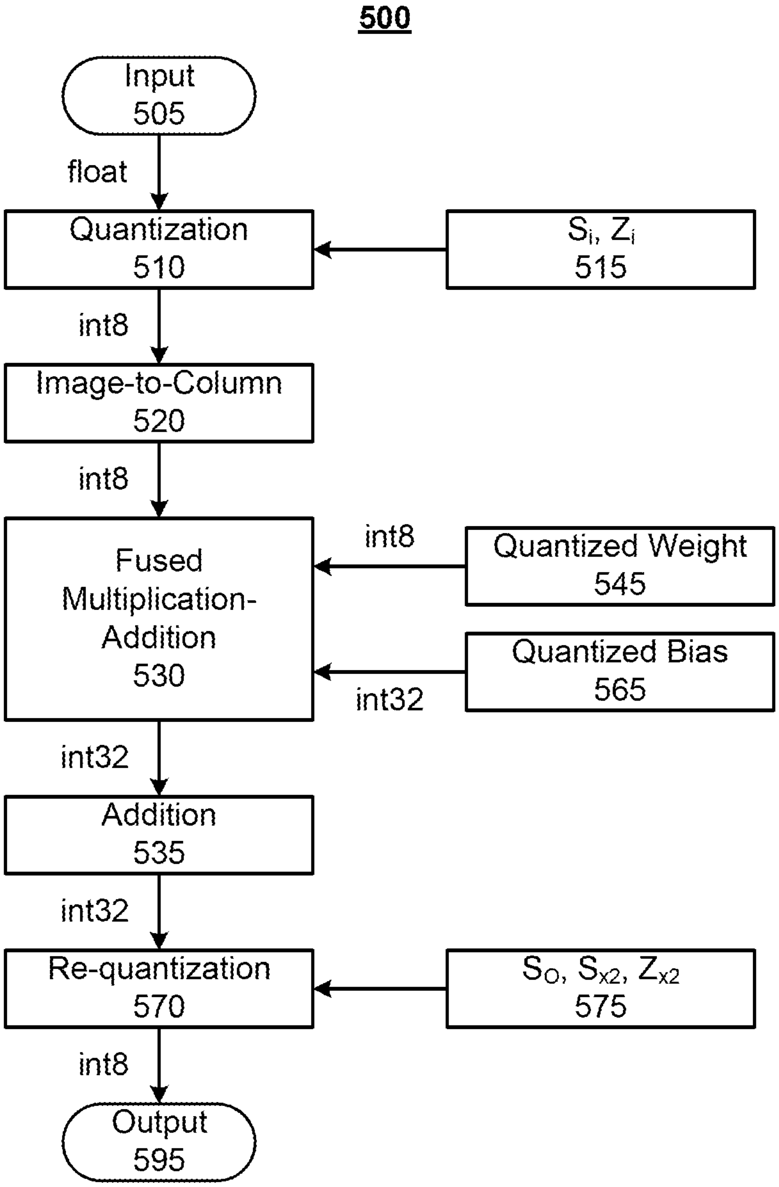
FIG. 5 illustrates a quantization architecture for operating one convolutional layer of a 4.6-bit QNN, according to an embodiment.

FIG. 5 illustrates a quantization architecture 500 for operating one convolutional layer of a 4.6-bit QNN to perform inference, according to an embodiment. It should be understood that the illustrated quantization architecture 500 is an example, and that other quantization architectures may be used in place of quantization architecture 500. The same architecture may be applied to the fully-connected layer, but without image-to-column transformation 520.

As illustrated, a quantization module 510 quantizes floating-point values in input 505 into integer values (e.g., 8-bit integer values), based on quantization parameters 515, comprising or consisting of scale factor $S_i$ and zero-point $Z_i$. It should be understood that quantization module 510 may be the same as quantization module 310, and quantization parameters 515 may be the same as quantization parameters 315. An image-to-column (im2col) transformation 520, which may be the same as image-to-column transformation 320, is applied to these quantized input values.

Then, fused multiplication-addition module 530 is applied to the output of image-to-column transformation 520, based on quantized weights 545 (e.g., 8-bit integer values) and quantized bias 565 (e.g., 32-bit integer values). The results are accumulated by addition module 535, and then the output of addition module 535 is re-quantized by re-quantization module 570, based on quantization parameters 575, which may comprise or consist of scaling factors $S_o$ and $S_{x2}$ and zero-point value $Z_{x2}$, to produce output 595 of the convolutional layer.

3. Experimental Results

The recognition quality, provided by the 4.6-bit quantization scheme, was tested experimentally using the publicly available Canadian Institute for Advanced Research 10 (CIFAR-10) dataset (Ref30). The disclosed 4.6-bit quantization scheme is parametric, with the parameter determining a trade-off between the number of quantization bins for weights and activations.

Several convolutional neural networks, with different numbers of layers and parameters, were trained to observe this trade-off and determine the best balance of quantization bins for QNNs. The lightweight neural-network architectures that were considered are described in the table below:

| CNN6 | CNN7 | CNN8 | CNN9 | CNN10 |
|---|---|---|---|---|
| conv(3, 4, 1) | conv(3, 8, 1) | conv(3, 8, 1) | conv(3, 8, 1) | conv(3, 8, 1) |
| ReLU | ReLU | ReLU | ReLU | ReLU |
| conv(4, 8, 5) | conv(8, 8, 3) | conv(8, 8, 3) | conv(8, 8, 3) | conv(8, 16, 3, 1) |
| BN + ReLU | BN + ReLU | BN + ReLU | BN + ReLU | BN + ReLU |
| pool(2) | conv(8, 12, 3) | conv(8, 12, 3) | conv(8, 12, 3) | conv(16, 32, 3, 1) |
| | BN + ReLU | BN + ReLU | BN + ReLU | BN + ReLU |
| | pool(2) | pool(2) | pool(2) | pool(2) |

-continued

| CNN6 | CNN7 | CNN8 | CNN9 | CNN10 |
|---|---|---|---|---|
| conv(8, 16, 3)<br>BN + ReLU<br>pool(2) | conv(12, 16, 3)<br>BN + ReLU<br>pool(2) | conv(12, 24, 3)<br>BN + ReLU<br>pool(2) | conv(12, 12, 3, 1)<br>BN + ReLU<br>conv(12, 24, 3)<br>BN + ReLU<br>pool(2) | conv(32, 32, 3, 1)<br>BN + ReLU<br>conv(32, 64, 3, 1)<br>BN + ReLU<br>pool(2) |
| conv(16, 32, 3)<br>BN + ReLU<br>pool(2)<br>FC(64)<br>tanh | conv(16, 32, 3)<br>BN + ReLU<br>pool(2)<br>FC(64)<br>tanh | conv(24, 24, 3)<br>BN + ReLU<br>conv(24, 40, 3)<br>BN + ReLU<br>FC(64)<br>tanh | conv(24, 24, 3)<br>BN + ReLU<br>conv(24, 48, 3)<br>BN + ReLU<br>FC(96)<br>tanh | conv(64, 64, 3)<br>BN + ReLU<br>conv(64, 64, 3)<br>BN + ReLU<br>conv(64, 128, 3)<br>BN + ReLU<br>FC(256)<br>tanh |
| FC(10) | FC(10) | FC(10) | FC(10) | FC(10) |
| | | Trainable Parameters | | |
| 15.5k | 16.8k | 28.9k | 40.5k | 315.2k |

In the above table, "conv(c,f,k,[p])" refers to a convolutional layer, wherein c is the number of input channels, f is the number of filters, k is the size of the kernel (i.e., k×k), and p is the padding in both directions. The term "pool(n)" refers to a two-dimensional max-pool width window of size n (i.e., n×n). "BN" refers to batch normalization, "ReLU" refers to Rectified Linear Unit activation, "FC(n)" refers to a fully-connected layer with n outputs, and "tanh" refers to hyperbolic tangent activation.

During the experiments, the layers of each convolutional neural networks were quantized one by one for two-hundred epochs per layer. The training of each layer was performed, according to process 400, using the Pytorch™ framework and a standard Adam optimizer with weight decay (AdamW) and default parameters. For the initial floating-point learning in subprocess 415, the learning rate was set to 1e-3, and reduced to 5e-4 at the 50th epoch, 2e-4 at the 200th epoch, 1e-4 at the 400th epoch, and 5e-5 at the 700th epoch. Training stopped at the 1000th epoch. Fine-tuning (e.g., in subprocesses 435, 450, and 460) was performed with a learning rate of 5e-5. Cross-entropy was used as a loss function. In all models, the first and last layers were not quantized.

In the experiment, the accuracy was explored for different combinations of quantization bins for weights and activations. Random horizontal flips and random crops, with an output size of 32 and a padding of 4, were used as an augmentation. The experiment was performed ten times. The resulting accuracies were averaged, and the error of the average accuracy was computed. The results for different combinations of quantization bins are depicted in the table below:

| Quantization | | Accuracy (%) | |
|---|---|---|---|
| $N_x$ | $N_w$ | CNN6 | CNN10 |
| 127 | 5 | 67.2 ± 0.3 | 85.7 ± 0.2 |
| 85 | 7 | 68.4 ± 0.4 | 85.9 ± 0.1 |
| 63 | 9 | 69.0 ± 0.3 | 86.0 ± 0.1 |
| 51 | 11 | 69.7 ± 0.3 | 86.0 ± 0.1 |
| 43 | 13 | 69.4 ± 0.3 | 86.1 ± 0.1 |
| 37 | 15 | 69.6 ± 0.3 | 85.9 ± 0.1 |
| 31 | 17 | 69.7 ± 0.3 | 85.9 ± 0.1 |
| 29 | 19 | 69.8 ± 0.3 | 86.0 ± 0.1 |
| 25 | 21 | 69.8 ± 0.3 | 85.9 ± 0.1 |
| 23 | 23 | 69.7 ± 0.3 | 85.8 ± 0.1 |
| 21 | 25 | 69.7 ± 0.2 | 85.8 ± 0.2 |

-continued

| Quantization | | Accuracy (%) | |
|---|---|---|---|
| $N_x$ | $N_w$ | CNN6 | CNN10 |
| 19 | 29 | 69.7 ± 0.3 | 85.6 ± 0.1 |
| 17 | 31 | 69.4 ± 0.3 | 85.7 ± 0.1 |
| 15 | 37 | 69.2 ± 0.3 | 85.6 ± 0.1 |
| 13 | 43 | 68.9 ± 0.3 | 85.4 ± 0.2 |
| 11 | 51 | 68.3 ± 0.2 | 85.2 ± 0.1 |
| 9 | 63 | 67.6 ± 0.3 | 84.6 ± 0.2 |
| 7 | 85 | 66.5 ± 0.2 | 84.1 ± 0.2 |
| 5 | 127 | 64.0 ± 0.3 | 82.5 ± 0.4 |
| Full Precision: | | 71.7 ± 0.3 | 86.1 ± 0.1 |

In the above table, $N_x$ is the number of quantization bins for activations and $N_w$ is the number of quantization bins for weights. As depicted in the table, the best results were observed for a relatively uniform distribution of bit width from the combination of (43, 13) to the combination of (19, 29). CNN6 demonstrated a maximum accuracy of 69.8%, compared to an accuracy of 71.7% for the full-precision model. CNN10 demonstrated no loss in accuracy with a maximum accuracy of 86.1%, which is identical to the accuracy of the full-precision model.

In another experiment, different neural architectures were evaluated with three pairs of quantization-bin distributions. The quantization-bin distributions were chosen to cover the range that demonstrated the best results in the experiment above. Random horizontal flips and random crops, with an output size of 32 and a padding of 4, and random rotations with a range of 9 degrees, were used as an augmentation. The experiment was performed ten times. The resulting accuracies were averaged, and the error of the average accuracy was computed. The results of the evaluations are depicted in the table below:

| Quantization | | Accuracy (%) | | | |
|---|---|---|---|---|---|
| $N_x$ | $N_w$ | CNN6 | CNN7 | CNN8 | CNN9 |
| 43 | 13 | 72.0 ± 0.4 | 76.3 ± 0.1 | 78.3 ± 0.1 | 79.9 ± 0.1 |
| 31 | 17 | 72.5 ± 0.3 | 76.4 ± 0.2 | 78.6 ± 0.2 | 80.1 ± 0.1 |
| 25 | 21 | 72.5 ± 0.4 | 76.6 ± 0.2 | 78.7 ± 0.2 | 80.2 ± 0.1 |
| 8-bit | | 75.1 ± 0.2 | 78.5 ± 0.1 | 80.1 ± 0.2 | 81.5 ± 0.1 |
| Full Precision | | 75.1 ± 0.3 | 78.4 ± 0.1 | 80.0 ± 0.2 | 81.3 ± 0.1 |

In the above table, $N_x$ is the number of quantization bins for activations and $N_w$ is the number of quantization bins for weights. As depicted in the table, 8-bit and full-precision models exhibit almost identical accuracy, while 4.6-bit models demonstrated lower accuracies. However, the relative gap between the accuracies of the 4.6-bit models and the 8-bit or full-precision models decreases for more complex models, such as CNN6 to CNN10.

In another experiment, the time required for inference by a 4.6-bit QNN was measured against the time required for inference by an 8-bit QNN. The neural networks were implemented in C++ and run on an ARM Cortex A-73 CPU, as part of an Odroid-N2 development board. The experiment was performed one-hundred times. The resulting times were averaged, and the error of the average time was computed. The results of the time measurements are shown in the table below:

| Network | Quantization | Time (ms) |
|---|---|---|
| CNN6 | 4.6-bit | 0.30308 ± 0.00001 |
| | 8-bit | 0.43350 ± 0.00001 |
| CNN7 | 4.6-bit | 0.48375 ± 0.00002 |
| | 8-bit | 0.73119 ± 0.00008 |
| CNN8 | 4.6-bit | 0.51785 ± 0.00002 |
| | 8-bit | 0.79043 ± 0.00009 |
| CNN9 | 4.6-bit | 0.57471 ± 0.00002 |
| | 8-bit | 0.90426 ± 0.00009 |

As depicted in the table above, the 4.6-bit QNNs were faster than the 8-bit QNNs by 1.4 to 1.6 times. This is a significant increase in inference speed.

4. Example Embodiments

Disclosed embodiments provide a parametric quantization scheme, referred to herein as "4.6-bit quantization," that provides fast inference on CPUs. Signed products of weights and activations were restricted to the capacity of 16-bit registers, and ranges of the signed products were obtained. In disclosed embodiments, these ranges are not limited to powers of two, and more quantization bins are provided than in 4-bit quantization. In an embodiment, because the 16-bit accumulators restrict the multiplication depth, a two-stage summation is performed with 16-bit and 32-bit accumulators.

ARM CPUs are considered the processors of choice for mobile and embedded devices, and experimentally prove the efficiency of the disclosed quantization method. All of the operations can be vectorized via the SIMD extension.

Conventionally, 8-bit quantization has been used to run neural networks on CPUs. Support for 8-bit quantization for both training and operation has appeared in Pytorch™ and Tensorflow™ frameworks, and has become a standard for recognition applications in mobile devices. The success of 8-bit quantization lies in its simplicity and efficiency for the architecture of modern processors and its high recognition accuracy, relative to full-precision models. As a result, other quantization schemes are generally not used for CPUs and are merely studied for academic purposes or in FPGA projects.

4.6-bit quantization is based on the architectural features of general-purpose CPUs. 4.6-bit quantization minimizes the number of instructions required, while maintaining the maximum possible number of quantization bins. In addition, during experiments, a 4.6-bit QNN was 1.4 to 1.6 times faster than a comparable 8-bit QNN on an ARMv8 CPU, and achieves the computational speed of 4-bit quantization.

4.6-bit quantization enhances the computational efficiency of neural networks, operating on mobile and embedded devices, while suffering only a small decrease in accuracy in the tested recognition task. This may encourage developers to push their recognition technologies to edge devices. This would be beneficial to security, since on-device processing is safer for sensitive data than external processing, and does not depend on data transfer and external servers.

The idea behind 4.6-bit quantization is that computationally efficient quantized matrix multiplication does not require input matrices to have a specific bit-width. However, it does require that the product of the matrix multiplication does not overflow the bit-width of the register. Thus, in embodiments, matrix multiplication is performed on signed quantized values that fit into signed 8-bit products, using 16-bit and 32-bit accumulators to avoid limitations on the multiplication depth. The number of quantization bins is a model hyperparameter, which impacts the recognition quality.

5. References

The present disclosure may refer to the following references, which are all hereby incorporated herein by reference as if set forth in their entireties:

Ref1: Esser et al., "Learned step size quantization," International Conference on Learning Representations, 2019;

Ref2: Jin et al., "AdaBits: Neural network quantization with adaptive bit-widths," Proceedings of the IEEE/CVF Conference on Computer Vision and Pattern Recognition, pp. 2146-2156, 2020;

Ref3: Lee et al., "Flexor: Trainable fractional quantization," Advances in Neural Information Processing Systems, vol. 33, pp. 1311-1321, Curran Associates, Inc., 2020;

Ref4: Jouppi et al., "In-datacenter performance analysis of a tensor processing unit," Proceedings of the 44th Annual International Symposium on Computer Architecture, pp. 1-12, 2017;

Ref5: Anderson et al., "First-generation inference accelerator deployment at Facebook," arXiv:2107.04140, 2021;

Ref6: Venkatapuram et al., "Custom silicon at Facebook: A datacenter infrastructure perspective on video transcoding and machine learning," 2020 IEEE International Electron Devices Meeting (IEDM), pp. 9-7, IEEE, 2020, doi: 10.1109/IEDM13553.2020.9372038;

Ref7: Zhang et al., "High performance depthwise and pointwise convolutions on mobile devices," Proceedings of the AAAI Conference on Artificial Intelligence, vol. 34, pp. 6795-6802, 2020;

Ref8: Elloumi et al., "Fast and accurate mobile-aided screening system of moderate diabetic retinopathy," 13th International Conference on Machine Vision, vol. 11605, p. 116050U, International Society for Optics and Photonics, 2021;

Ref9: Afifi et al., "Robust real-time pedestrian detection on embedded devices," 13th International Conference on Machine Vision, vol. 11605, pp. 654-660, International Society for Optics and Photonics, 2021, doi:10.1117/12.2587097;

Ref10: Arlazarov et al., "MIDV-500: a dataset for identity document analysis and recognition on mobile devices in video stream," Computer Optics, 43(5):818-824, 2019;

Ref11: Vanhoucke et al., "Improving the speed of neural networks on CPUs," Deep Learning and Unsupervised Feature Learning Workshop, NIPS, 2011;

Ref12: Jacob et al., gemmlowp: a small self-contained low-precision GEMM library, 2017, github.com/google/gemmlowp;

Ref13: The Ruy matrix multiplication library, 2020, github.com/google/ruy;

Ref14: QNNPACK: Ppen source library for optimized mobile deep learning, 2018, github.com/pytorch/QNNPACK;

Ref15: Choi et al., "TernGEMM: General matrix multiply library with ternary weights for fast DNN inference," 2021 IEEE Workshop on Signal Processing Systems (SiPS), pp. 111-116, IEEE, 2021;

Ref16: Zhang et al., "daBNN: A super fast inference framework for binary neural networks on ARM devices," Proceedings of the 27th ACM International Conference on Multimedia, 2019;

Ref17: Trusov et al., "Fast implementation of 4-bit convolutional neural networks for mobile devices," 2020 25th International Conference on Pattern Recognition (ICPR), pp. 9897-9903, IEEE, 2021;

Ref18: Won et al., "ULPPACK: Fast sub-8-bit matrix multiply on commodity SIMD hardware," Proceedings of Machine Learning and Systems, 4, 2022;

Ref19: Cowan et al., "Automatic generation of high-performance quantized machine learning kernels," Proceedings of the 18th ACM/IEEE International Symposium on Code Generation and Optimization, pp. 305-316, 2020;

Ref20: Jacob et al., "Quantization and training of neural networks for efficient integer-arithmetic-only inference," Proceedings of the IEEE Conference on Computer Vision and Pattern Recognition, pp. 2704-2713, 2018;

Ref21: Banner et al., "Post training 4-bit quantization of convolutional networks for rapid-deployment," Advances in Neural Information Processing Systems, 32, 2019;

Ref22: Choukroun et al., Low-bit quantization of neural networks for efficient inference," 2019 IEEE/CVF International Conference on Computer Vision Workshop (ICCVW), pp. 3009-3018, IEEE, 2019;

Ref23: Anderson et al., "High-performance low-memory lowering: GEMM-based algorithms for DNN convolution," 2020 IEEE 32nd International Symposium on Computer Architecture and High Performance Computing (SBAC-PAD), pp. 99-106, IEEE, 2020;

Ref24: Georganas et al., "Anatomy of high-performance deep learning convolutions on SIMD architectures," SC18: International Conference for High Performance Computing, Networking, Storage and Analysis, pp. 830-841, IEEE, 2018;

Ref25: Dukhan, "The indirect convolution algorithm," arXiv:1907.02129, 2019;

Ref26: Goto et al., "Anatomy of high-performance matrix multiplication," ACM Transactions on Mathematical Software (TOMS), 34(3):1-25, 2008;

Ref27: Zhou et al., "DoReFa-Net: Training low bitwidth convolutional neural networks with low bitwidth gradients," arXiv:1606.06160, 2016;

Ref28: Ioffe et al., "Batch normalization: Accelerating deep network training by reducing internal covariate shift," International Conference on Machine Learning, pp. 448-456, PMLR, 2015;

Ref29: Yin et al., "Understanding straight-through estimator in training activation quantized neural nets," arXiv: 1903.05662, 2019; and Ref30: Krizhevsky, "Learning multiple layers of features from tiny images," 2009.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to, for one or more layers to be quantized in a neural network:

determine a number (Nw) of quantization bins for weights and a number (Nx) of quantization bins for activations as symmetric odd integers satisfying $-128 \leq w \cdot x \leq 127$ for all quantized weights w and activation coefficients x, wherein the pairing (Nw, Nx) is selected from the set of pairings where Nw=2w_max+1, Nx=2x_max+1, and $w\_max \cdot x\_max \leq 127$, so that a product of a quantized weight and a quantized activation coefficient is representable by a signed 8-bit integer;

during training of each of the one or more layers to be quantized in the neural network, quantize weights of the layer into the quantization bins for weights; and perform matrix multiplication in each of the one or more layers by:

(i) over a plurality of iterations in an inner loop, accumulating products of matrix multiplication, on blocks representing reordered subsets of values from left and right matrices, into inner accumulators that are 16 bits and stored in registers of the at least one hardware processor, (ii) limiting a number of the plurality of iterations in the inner loop to no more than 258; and iii) over one or more iterations of an outer loop, accumulating the accumulated products from the plurality of iterations in the inner loop into outer accumulators that are 32 bits and stored in a Level 1 (L1) cache of the at least one hardware processor.

2. The method of claim 1, wherein the at least one hardware processor comprises an Advanced Reduced Instruction Set Computer Machine (ARM) processor.

3. The method of claim 2, wherein the products of matrix multiplication are computed using Single Instruction, Multiple Data (SIMD) instructions.

4. The method of claim 1, wherein the outer loop comprises a plurality of iterations, and wherein a number of the plurality of iterations in the outer loop is limited to no more than 258 iterations.

5. The method of claim 1, further comprising using the at least one hardware processor to, after the training, store the quantized weights of the one or more layers.

6. The method of claim 5, further comprising using the at least one hardware processor to, after the training, deploy the neural network, as a quantized neural network, including the quantized weights, to an application for execution on a mobile or embedded device.

7. The method of claim 1, further comprising using the at least one hardware processor to quantize each of the one or more layers to be quantized in the neural network by:

training the layer without quantizing inputs to the layer;

collecting a histogram of the inputs to the layer;

determining input quantization parameters that minimize quantization error for the inputs to the layer based on the histogram;

quantizing the inputs to the layer channel by channel using the input quantization parameters;

determining weight quantization parameters that minimize quantization error for weights of the layer;

quantizing the weights of the layer filter by filter using the weight quantization parameters; and quantize a bias of the layer based on one or both of the input quantization parameters and the weight quantization parameters.

8. The method of claim 7, wherein the input quantization parameters are frozen after being determined.

9. The method of claim 7, wherein the weights and the bias of the layer are not frozen during the quantization.

10. The method of claim 7, further comprising using the at least one hardware processor to, during quantization of each of the one or more layers to be quantized in the neural network, fine-tune the layer:

after quantizing the inputs to the layer and before determining the weight quantization parameters;

after quantizing the weights of the layer and before quantizing the bias of the layer; and after quantizing the bias of the layer.

11. The method of claim 1, wherein the number of quantization bins for weights is between 9 and 37.

12. The method of claim 1, wherein the number of quantization bins for weights is between 13 and 29.

13. The method of claim 1, wherein, for the one or more layers to be quantized in the neural network, the pairing ($N_w$, $N_x$) is one of:

(127, 5);
(85, 7);
(63, 9);
(51, 11);
(43, 13);
(37, 15);
(31, 17);
(29, 19);
(25, 21);
(23, 23);
(21, 25);
(19, 29);
(17, 31);
(15, 37);
(13, 43);
(11, 51);
(9,63);
(7,85); and
(5, 127).

14. A system comprising:

at least one hardware processor; and one or more software modules that are configured to, when executed by the at least one hardware processor, for one or more layers to be quantized in a neural network, perform the method of claim 1.

15. A non-transitory computer-readable medium having instructions stored therein, wherein the instructions, when executed by a processor, cause the processor to, for one or more layers to be quantized in a neural network, perform the method of claim 1.

* * * * *